(12) United States Patent
Aikala (10) Patent No.: US 10,750,586 B2
(45) Date of Patent: Aug. 18, 2020

(54) HORTICULTURAL LUMINAIRE, HORTICULTURAL LIGHTING ARRANGEMENT AND METHOD FOR CONTROLLING HORTICULTURAL LIGHTING ARRANGEMENT

(71) Applicant: Valoya Oy, Helsinki (FI)

(72) Inventor: Lars Aikala, Helsinki (FI)

(73) Assignee: VALOYA OY, Helsinki (FI)

(*) Notice: Subject to any disclaimer, the term of this patent is extended or adjusted under 35 U.S.C. 154(b) by 0 days.

(21) Appl. No.: 16/345,549

(22) PCT Filed: Oct. 25, 2017

(86) PCT No.: PCT/FI2017/050738
§ 371 (c)(1),
(2) Date: Apr. 26, 2019

(87) PCT Pub. No.: WO2018/078217
PCT Pub. Date: May 3, 2018

(65) Prior Publication Data
US 2019/0320511 A1  Oct. 17, 2019

(51) Int. Cl.
*H05B 45/10* (2020.01)
*A01G 7/04* (2006.01)
(Continued)

(52) U.S. Cl.
CPC ............ *H05B 45/10* (2020.01); *A01G 7/045* (2013.01); *H05B 47/105* (2020.01); *H05B 47/19* (2020.01);
(Continued)

(58) Field of Classification Search
CPC ............... H05B 37/02; H05B 37/0227; H05B 37/0272; H05B 37/0863; H05B 37/0872;
(Continued)

(56) References Cited

U.S. PATENT DOCUMENTS 9,137,874 B2 * 9/2015 Maxik ............... H05B 37/02
9,644,828 B1 * 5/2017 May ..................... F21V 7/00
(Continued)

FOREIGN PATENT DOCUMENTS

WO     2016/138075 A1    9/2016

OTHER PUBLICATIONS

International Search Report, dated Feb. 7, 2018, from corresponding international application No. PCT/FI2017/050738.
(Continued)

*Primary Examiner* — Haissa Philogene
(74) *Attorney, Agent, or Firm* — Young & Thompson (57) ABSTRACT

Disclosed is a horticultural luminaire, a horticultural lighting arrangement including a plurality of the horticultural luminaires, and a method for controlling the horticultural lighting arrangement. The horticultural luminaire includes a main light emitting unit including at least one LED for generating a main spectrum, an environmental sensor for measuring environmental data, and control electronics for determining a position data representing position of the horticultural luminaire, sending out the environmental data and the position data, receiving control data, and controlling the emission intensity of the main light emitting unit on the basis of the control data.

21 Claims, 3 Drawing Sheets

(51) Int. Cl.
  *H05B 47/19* (2020.01)
  *H05B 47/105* (2020.01)
  *F21Y 115/10* (2016.01)
  *F21Y 113/13* (2016.01)
(52) U.S. Cl.
  CPC ........ *F21Y 2113/13* (2016.08); *F21Y 2115/10* (2016.08); *Y02P 60/149* (2015.11)
(58) Field of Classification Search
  CPC ............ H05B 37/0845; H05B 37/0854; H05B 45/00; H05B 45/10; H05B 47/10; H05B 47/16; H05B 47/19; H05B 47/105; H05B 47/155; H05B 47/175; A01G 1/001; A01G 1/042; A01G 7/045; Y02P 60/146; Y02P 60/149; F21V 23/0442; F21V 23/0471; F21Y 2115/10; F21Y 2113/13
  See application file for complete search history.

(56) References Cited

U.S. PATENT DOCUMENTS

| | | | |
|---|---|---|---|
| 9,872,357 B1 * | 1/2018 | Aikala | H05B 33/0854 |
| 9,894,729 B2 * | 2/2018 | Forbis | H05B 33/0872 |
| 9,943,042 B2 * | 4/2018 | Thosteson | H05B 37/0272 |
| 10,021,837 B2 * | 7/2018 | Greenberg | A01G 7/045 |
| 2015/0089867 A1 | 4/2015 | Abbott et al. | |
| 2016/0113213 A1 | 4/2016 | Berinsky | |
| 2016/0219794 A1 | 8/2016 | Greenberg et al. | |
| 2017/0035002 A1 * | 2/2017 | Ellins | A01G 9/247 |
| 2019/0082613 A1 * | 3/2019 | Eisele | H05B 45/20 |

OTHER PUBLICATIONS

International Preliminary Report on Patentability, dated Jan. 15, 2019, from corresponding international application No. PCT/FI2017/050738.
Stanislas Du Guerny: "Adventiel developpe des luniettes connectees pour l'agriculture", L'Usine Digitale, Feb. 26, 2016 (Feb. 26, 2016), XP055506520, Retrieved from the Internet: URL: https://www.usine-digitale.fr/article/adventiel-developpe-deslunettes-connectees-pour-l-agriculture.N381746 (with English machine translation provided).
European Office Action, dated Apr. 23, 2020, from corresponding European Application No. 17804930.0.

* cited by examiner

HORTICULTURAL LUMINAIRE, HORTICULTURAL LIGHTING ARRANGEMENT AND METHOD FOR CONTROLLING HORTICULTURAL LIGHTING ARRANGEMENT

FIELD

The present disclosure relates to lighting arrangements, and particularly to controlling lighting in horticultural lighting arrangements.

BACKGROUND INFORMATION

Greenhouses and growth rooms utilize artificial lighting in supplementing, supporting or replacing natural light provided by the sun. As a result, greenhouses and growth rooms enable growing plants outside their natural growth season, and also growing plants of foreign climatic conditions.

Traditional light sources used for supplementing natural light (Greenhouses) or to create illumination in conditions where natural light is 100% absent (growth rooms), are High Pressure Sodium, Metal Halide and Fluorescent tubes. More recently, Light Emitting Diodes (LEDs) have evolved to a state where their light output in relation to energy input has risen and the quality of light (light spectrum) for plant growing purposes has also evolved to a level where LEDs now are usable for plant illumination.

An aspect in greenhouse/growth room cultivation is monitoring of environmental conditions in the cultivation environment. It may be desirable to place various environmental sensors in the cultivation environment in order monitor and adjust various parameters of the cultivation environment. The environmental sensors may be used for measuring temperature, humidity, light levels, and/or amount of $CO_2$, for example. If the positions of the sensors are known, the sensors can provide localized information within the cultivation environment. With higher number of sensors, a more accurate view on the localized conditions within the cultivation environment can be formed.

However, commissioning and management of the system may become increasingly difficult as the number of sensors in a cultivation system increases. Manual detection and recording of the positions of the sensors may be a cumbersome and error-prone task due to risk of human errors in manufacturing, installation and the recording of the position data.

BRIEF DISCLOSURE

An object of the present disclosure is to provide a method and an apparatus for implementing the method so as to alleviate the above disadvantages. The object of the disclosure is achieved by a method and an arrangement which are characterized by what is stated in the independent claims. The preferred embodiments of the disclosure are disclosed in the dependent claims.

The present disclosure describes a horticultural luminaire comprising a main light emitting unit that generates a main spectrum and at least one environmental sensor for measuring environmental data. Because LED-based light sources have a completely different technological starting point than the traditional light sources, new, additional functionalities have become available to be considered in a horticultural luminaire. A LED-based luminaire can be implemented with LED components mounted on a printed circuit board (PCB). The PCB also forms a platform also for other components than the LED component. For example, the luminaire may be provided with environmental sensor or sensors detecting for temperature, humidity, light levels, $CO_2$. Sensors embedded to a luminaire may even be used for monitoring plant growth and soil conditions of the plants.

As horticultural luminaires are located densely in greenhouses, and very densely in growth rooms, they are well positioned for monitoring what happens around and below them. A system with luminaires according to the present disclosure enables increasing the environmental monitoring data density significantly in greenhouses and growth rooms, as traditionally only a few sensors per greenhouse or a single sensor set have been deployed.

When a large number of luminaires continuously or frequently generated sensor data, it may be desirable to be able to accurately and easily determine the position of each luminaire so that the generated sensor data can be fully utilized. When sensor data from each luminaire can be coupled to a known location, the sensors are able to provide more detailed, localized information, and thus, more educated climate control decisions can be taken, leading to improved plant growth. Thus, horticultural luminaires according to the present disclosure may each comprise means for providing position data used to automatically determine the position of said luminaire. The ability to automatically detect the position of each luminaire (and hence the sensors within it) will greatly improve the usability of such a system and lower the threshold to its widespread adoption.

BRIEF DESCRIPTION OF THE DRAWINGS

In the following the invention will be described in greater detail by means of preferred embodiments with reference to the attached drawings, in which.

DETAILED DISCLOSURE

The present disclosure describes a horticultural luminaire and a horticultural lighting arrangement comprising a plurality of luminaires. The present disclosure further describes a method for controlling a horticultural lighting arrangement.

In this context, a luminaire (or, interchangeably, a lighting fixture) is a device that is ready to be used as a light source, e.g. in a greenhouse or a growth room. A luminaire comprises a frame and one or more light emitting units attached to the frame. The luminaire may further comprise at least one power unit which acts as means for converting electric energy supplied to the luminaire into a suitable form of electric energy in order to be consumed by the light emitting units. The luminaire may also comprise a cooling device, such as passive cooling in the form of cooling fins. Further, in the context of the present disclosure, a horticultural lighting arrangement comprises a plurality of horticultural luminaires, and is intended for providing lighting supporting/replacing natural light in order to cultivate crops.

The present disclosure discusses horticultural luminaires and horticultural lighting arrangements mainly in relation large-scale use. The luminaires and lighting arrangements may be intended for professional use, e.g. or research or commercial production of plants. Power rating of a horticultural luminaire according to the present disclosure may range from tens of watts to hundreds of watts, for example. Rated power consumption of a horticultural lighting arrangement may be in the range of tens of kilowatts to hundreds or thousands of kilowatts, for example. Because of high power consumption, good energy efficiency of the horticultural lighting arrangement may be desirable. Further, when a large number of luminaires are being used, maintenance of the luminaires may have logistical challenges. These aspects may not be significant (or present at all) in small-scale horticultural luminaires, such as horticultural luminaires intended for home or office use, or in small-scale horticultural lighting arrangements, such as hobbyist greenhouses.

A horticultural luminaire and a horticultural lighting arrangement according to the present disclosure may be used in a greenhouse or a growth room, for example. In a greenhouse, for example, the horticultural luminaire and the horticultural lighting arrangement may be used for providing additional lighting at a desired spectrum. In a growth room, for example, the horticultural lighting arrangement may be a part of a larger climate control system that also controls temperature, humidity, and/or $CO_2$ concentration, for example. The lighting arrangement according to the present disclosure may be the sole source of lighting.

A horticultural luminaire according to the present disclosure comprises means for generating one or more spectrums of light. For example, the luminaire may comprise a first, main light emitting unit for generating a first, main spectrum and a first controller unit for controlling the emission intensity of the first light emitting unit.

In the context of the present disclosure, a light emitting unit may comprise one or more LEDs (Light Emitting Diodes), or one or more modules comprising a plurality of LEDs, for example. A light emitting unit may comprise one or more groups of LEDs, each group generating a different spectrum. Each LED (or group of LEDs) may generate a spectrum with one or more peaks at predetermined wavelengths. The p-n junction of a LED may be configured to emit a primary emission peaking at a certain wavelength. Further, the LED may be provided with an up-conversion material that converts (a part or all of) the primary emission into a secondary emission peaking at a second wavelength. The up-conversion materials may be phosphors, for example. The LED may be provided with a plurality of up-conversion materials resulting in peaks at a plurality of wavelengths. A light emitting unit may also be a group of LEDs (or other light source components) that together generate a predetermined spectrum.

The first controller unit may be configured to be able to adjust the emission intensity from 0.6% or 10% to 100% of the rated emission capacity (i.e. rated power) of the first light emitting unit, for example. The main spectrum may approximate the spectrum of sun light, for example. Alternatively, the main spectrum may be configured for a specific purpose. For example, the main spectrum may be configured for efficient plant cultivation in a greenhouse or a growth room. In order to achieve this, the main spectrum may comprise peaks that coincide with absorption peaks of photoreception of plants. Two important absorption peaks of photosynthetic photoreceptors are located in the red and blue regions from 625 to 675 nm and from 425 to 475 nm, respectively.

Additionally, there are also other localized peaks at near-UV (300-400 nm) and in the far-red region (700-800 nm). In addition, photomorphogenetic photoreceptors of plants have sensitivity peaks in the red at 660 nm and in the far-red at 730 nm. Green light (500-600 nm) is less efficient for photosynthesis of plants, as green plants reflect these wavelengths.

Figure 1:
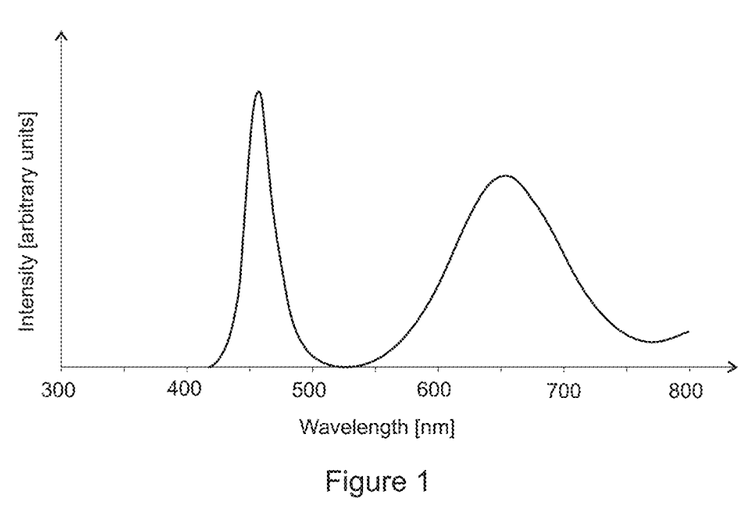
FIG. 1 shows an exemplary diagram of a main spectrum of a main light emitting unit for efficient plant cultivation.

FIG. 1 shows an exemplary diagram of a main spectrum of a main light emitting unit for efficient plant cultivation. In FIG. 1, a spectrum with two distinct peaks is shown. A first, blue peak has its maximum at approximately 460 nm. The first peak may be generated with the primary emission of a LED, for example. The second, red peak has its maximum at approximately 660 nm. The second peak may be secondary emission generated with an up-conversion material from the primary emission of a LED. Because light in the range of 500-600 nm is less efficient for the photosynthesis of plants, the main spectrum may have low emissions at said range. In FIG. 1, the emission at wavelengths of 500-600 nm is below an intensity in the blue (400-500 nm) band and below an intensity in the red (600-700 nm) band.

The horticultural luminaire according to the present disclosure may further comprise means for generating at least one side spectrum that differs from the main spectrum. For example, in addition to the first light emitting unit, the luminaire may comprise a second, auxiliary light emitting unit for generating a second, side spectrum and a second controller unit for controlling the emission intensity of the auxiliary light emitting unit. The side spectrum may be independently controllable from the main spectrum. The rated emission capacity of a auxiliary light emitting unit generating a side spectrum may be only a fraction (e.g. 50% or even only 10%) of the rated emission capacity of the first light emitting unit that generates the main spectrum. In this manner, a power supply for the auxiliary light emitting unit can be implemented with smaller and less expensive components.

Figure 2A:
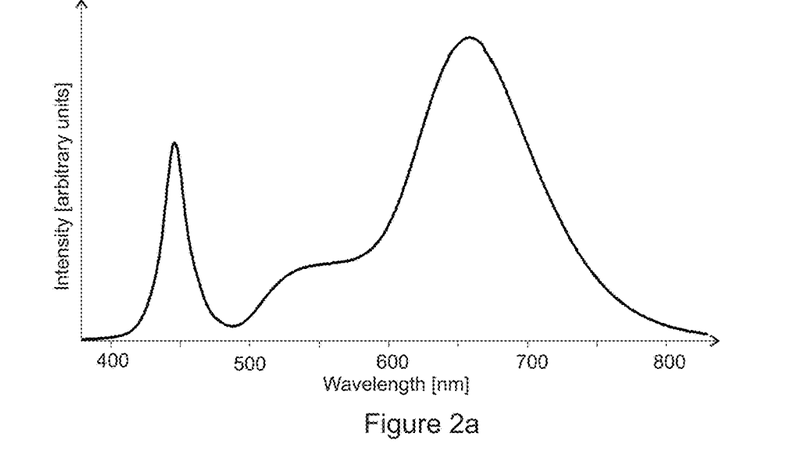
FIGS. 2a to 2c show exemplary diagrams of a main spectrum, a side spectrum, and their combination.
Figure 2B:
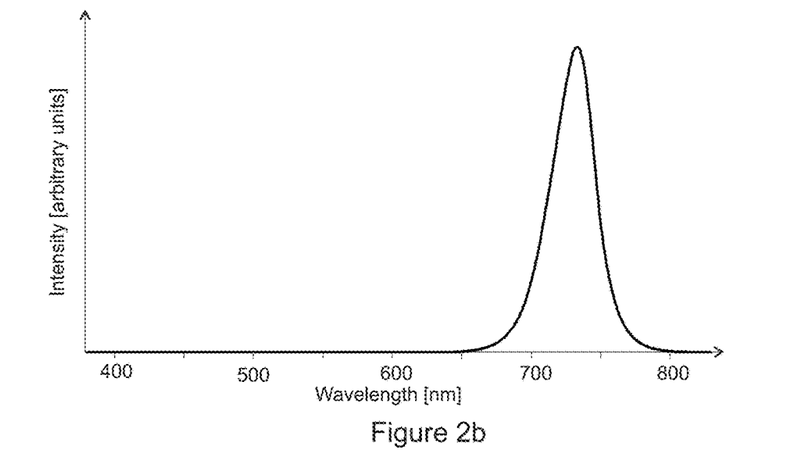
Figure 2C:
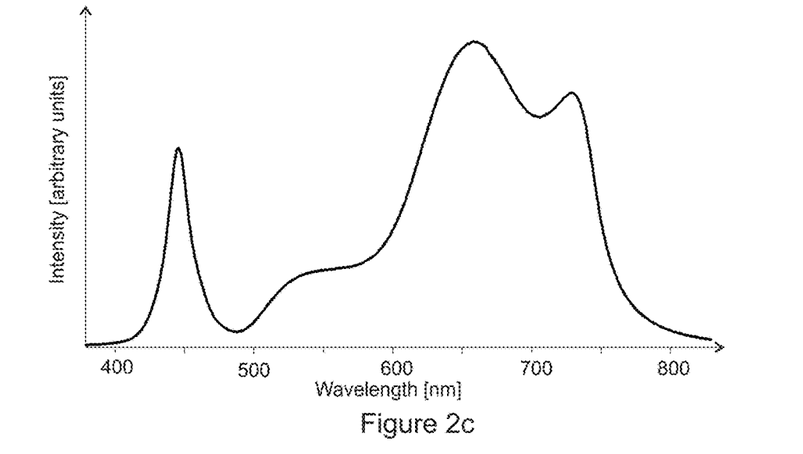

FIGS. 2a to 2c show exemplary diagrams of a main spectrum, a side spectrum and their combination. FIG. 2a shows an exemplary main spectrum generated by a main first light emitting unit. The main spectrum comprises a blue peak having its maximum at 450 nm and a red peak having its maximum at 660 nm. The blue peak and the red peak coincide with absorption peaks of photosynthetic photoreception of plants. Further, the red peak coincides with an absorption peak of photomorphogenetic photoreception of plants. In addition, the main spectrum in FIG. 2a has a (low-intensity) peak having its maximum at about 540 nm. This peak coincides with a high photoreception sensitivity of a chromatic channel of insect vision. In addition, the blue peak coincides with a high photoreception sensitivity of another chromatic channel of insect vision. Thus, peaks producing emissions at two different chromatic channels of insect vision are present in FIG. 2a. Having at least some emissions at wavelengths of high sensitivity of at two different chromatic channels of insect vision can significantly improve pollination performed by insects, such as bumblebees.

FIG. 2b shows an exemplary side spectrum. The side spectrum in FIG. 2b comprises a single peak having its maximum in the far-red region at about 730 nm. This peak coincides with a second absorption peak of photomorphogenetic photoreceptors in the far-red region.

FIG. 2c shows an exemplary combination of the main and side spectrum. Photomorphogenetic responses are usually related to the sensing of the light quality in the form of the red (R) to far-red (FR) ratio (R/FR). By controlling the ratio (R/FR), photomorphogenetic responses, such as leaf expansion, neighbour perception, shade avoidance, stem elongation, seed germination and flowering induction, may be controlled.

The horticultural luminaire may also comprise means for generating a plurality of side spectrums. Each of these side spectrums may be independently controllable. The horticultural luminaire may comprise a plurality of lighting devices, and a plurality of controller units controlling the lighting devices. Each controller unit may be configured to be able to separately adjust the emission intensity of its respective lighting device between 0.6% to 100% of the rated emission capacity of said lighting device, for example.

With the side spectrum or spectrums, the main spectrum may be modified in order to achieve a desired final spectrum. With the side spectrum/spectrums, the final spectrum may be configured to represent natural lighting at a different time of year, for example. Alternatively, or in addition, the final spectrum may be configured to represent natural lighting in different environments and/or different locations around the globe.

Each luminaire according to the present disclosure may comprise control electronics configured to receive control data, and to control a final spectrum of the luminaire in response to the control data. The control electronics of each luminaire may comprise, for each light emitting unit in the luminaire, a controller unit configured to control the emission intensity of said light emitting unit on the basis of the control data. The control electronics may be implemented as an electronics card, for example. The control electronics may be implemented on the same PCB as the light emitting units of the luminaire according to the present disclosure, for example. The control data may originate from a lighting control system that controls all luminaires in a lighting arrangement, for example. In some embodiments, the control electronics may receive its control data wirelessly or via wires from a computing cloud or a central computer acting as the lighting control system. The lighting control system may be control electronics or a control system dedicated to controlling lighting. The lighting control system may also be a part of a larger control system. For example, the lighting control system may be a part of a climate control system controlling also other parameters, such as temperature, humidity, light levels and/or $CO_2$ concentration of a cultivation space.

In some embodiments, the control data received by a luminaire may represent a voltage or current reference producing a desired emission intensity of a main/side channel. A controller unit in the control electronics may control a power unit acting as a power supply that drives the current flowing through the LEDs of a light emitting unit. The power unit may be a switching converter, for example. The controller unit may comprise a control loop that controls an output of the power unit towards a reference level received in the control data.

Alternatively, the control data may be used for directly controlling the power unit in order to achieve a desired emission intensity. For example, the control data may comprise information on a duty cycle of pulse width modulation (PWM) of the power unit.

In some embodiments, the power unit may be in the form of a standard power supply generating a constant voltage. The luminaire may comprise a switching circuit comprising semiconductor switches between the standard power supply and the LEDs. The control electronics may then control the modulation of the switching circuit on the basis of the control data which may represent a desired duty cycle or a desired current reference, for example.

The control data may also directly represent desired emission intensity levels. In such a case, the control electronics may comprise means for converting the intensity levels it receives into control signals controlling the power unit. These means may be in the form of a computing device and a memory, for example. The computing device may be a microprocessor, an FPGA or an ASIC, for example.

A control scheme for luminaires according to the present disclosure may take many forms. In some applications, the behaviour can be uniform for all luminaires in a growing space. All luminaires in the lighting arrangement may be provided with the same control data. However, it may also be desirable to be able to control the luminaires separately. In this manner, a space illuminated by the horticultural lighting arrangement can be divided into regions with different lighting parameters, for example in order to have different light for young plants and other light for mature plants. The emission intensities of light emitting units in a luminaire may be altered (e.g. dimmed up or down) as a group, or the emission intensities of the light emitting units may be controlled independently, thus changing the ratios between the peaks in the final spectrum of the luminaire. The generated light may also be automatically adjusted based on sensor data. For example, if ambient temperature exceeds 40° C., a horticultural luminaire according to the present disclosure may dim its emission to a 70% level as a safety function.

The control data may be provided by wired or wireless communications unit in the control electronics. For example, wired industrial field buses may be used for transmitting the data. However, when the number of luminaires in a horticultural lighting arrangement is large, providing control data to each luminaire separately with a wired connection may become impractical. Thus, the luminaires may be provided with wireless communication units. Each luminaire may comprise a wireless transceiver module, for example. The wireless module may be a UWB (Ultra Wide Band) communications, Bluetooth and Zigbee module, for example. Via the wireless communication modules, the luminaires may each receive different control data originating from a lighting control system. Each luminaire may be provided with a unique identifier, such as an identification number. With this unique identifier, each luminaire can be identified, and different control data can be directed to different luminaires.

In addition to receiving control data from the lighting control system, the control electronics of the luminaires may be configured to send information to the lighting control system. For example, the luminaire may comprise at least one sensor. The at least one sensor may be integrated to the luminaire, or it may be in the form of an attachable module. Alternatively, or in addition, the luminaire may comprise receiving means for receiving sensor data from an external sensor. Wired or wireless communication units in the luminaires may act as these receiving means. The sensors may generate various kinds of sensor data. For example, a horticultural luminaire according to the present disclosure may receive environmental sensor data on light spectrum, temperature, humidity, and/or $CO_2$ concentration in the vicinity of the luminaire. The luminaire may also comprise a proximity sensor that measures the distance between the luminaire and an object within a light cone of the luminaire. The object may be a plant that the luminaire is arranged to illuminate, for example. The control electronics can serve as an interface for transmitting the environmental data generated by the sensors. Sensors monitoring internal conditions (e.g. operating temperature) and external conditions (e.g. ambient environmental parameters) of luminaires may be connected to the control electronics and communicate their data via a wireless or wired communications channel to the lighting control system.

In addition to environmental sensor data, a horticultural luminaire according to the present disclosure may also provide other information to the lighting control system. For example, each luminaire may send the lighting control system information on their configuration. For example, if a modular luminaire structure is being used, the luminaire may send the lighting control system information on the type/specification of its modules. Further, the luminaires may provide information on their current operating status. Each luminaire may send the lighting control system information on its operating temperature and/or the currents flowing through its light emitting units. For example, by allocating some sensors in the luminaire to monitoring the temperature of the luminaire inside the luminaire or close to the LED components of the light emitting units, it is possible to monitor the condition of the luminaire itself. Since the use life of LEDs decays as a function of (too much) heat, it may be desirable to monitor the temperature inside and outside of the luminaire and to command the luminaire to shut down or lower light intensity (and thus decrease heat generation) as a response to excessive heat.

If the large number of luminaires in a horticultural lighting arrangement is large, commissioning of the lighting arrangement may be challenging. Manually identifying each luminaire and assigning it to a correct location within a floor plan may be prone to errors. Further, pinpointing and correcting possible errors afterwards may be difficult. Thus, it may be desirable to be able to automatically determine the locations of the luminaires.

In order to be able to determine positions of horticultural luminaires according to the present disclosure, the control electronics of the horticultural luminaires may be configured to determine position data. In some embodiments, each luminaire comprises an identical wireless positioning unit. During commissioning, the positioning units may communicate with each other and utilize an algorithm with which the positioning units are able to self-configure positions of the positioning units (and, thus, the luminaires). A wireless communication unit (which may also be used for receiving control data, for example) in the luminaire enables the luminaire to be positioned. Positioning of a UWB (Ultra Wide Band), Bluetooth or Zigbee module may be based on time of flight (TOF), for example. For example, a TOF of a radio signal from a wireless communications module in a luminaire to reach separate, external receivers at known locations may be measured, and the position of the luminaire may be triangulated on the basis of the TOFs. In some embodiments, the positioning is constantly active. However, in other embodiments, only an initial positioning during commissioning will be sufficient since the positions of the luminaires remain constant. Thus, in some embodiments, the separate, external receivers may be removed once the initial positioning has been done. In addition to wireless positioning based on radio signals, the determining of the positions of the luminaires may be based on sending and receiving acoustic signals, for example.

In the context of the present disclosure, the terms "location" and "position" may represent an absolute position, i.e. distance information identifying the position of the luminaire in space, e.g. in the form of coordinates. If the luminaires are arranged into an array with at even distances, position of the luminaire may be in the form as an index within the array. Further, "location" and "position" may represent a relative position, i.e. a position of a luminaire with respect to other luminaires. Relative position may be in the form of values representing distances to other luminaires, for example.

Once the positions of the luminaires in a horticultural lighting arrangement have been determined, the information may be sent to the lighting control system. Although the luminaires in the examples are arranged into a two-dimensional array in the above examples, other configurations are also possible. For example, the floor plan may dictate the positions of the luminaires. The luminaires may be arranged into an irregular configuration. Further, the luminaires may be arranged to a configuration that extends in three dimensions. For example, the luminaires may be arranged to different heights in a staggered manner.

Figure 3:
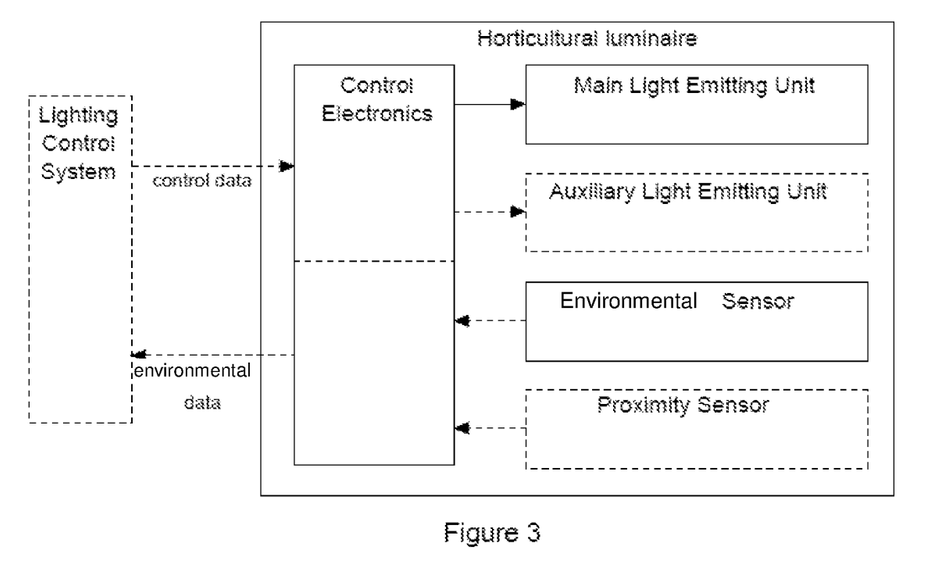
FIG. 3 illustrates a horticultural lighting arrangement including a lighting control system and a horticultural luminaire.
Figure 4:
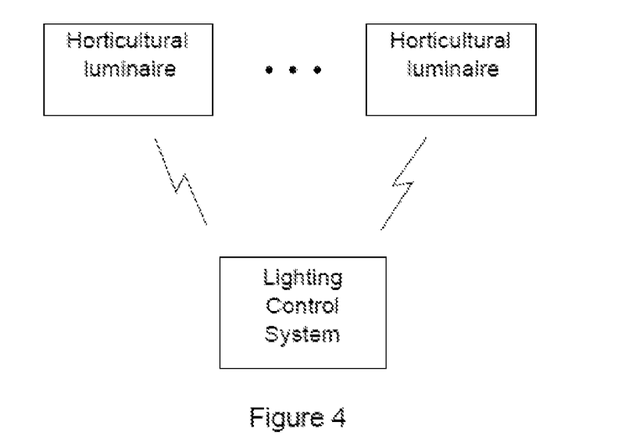
FIG. 4 illustrates a horticultural lighting arrangement including a lighting control system and a plurality of horticultural luminaires.

Horticultural luminaires and a horticultural lighting arrangement according to the present disclosure enable new ways for implementing a horticultural lighting. As illustrated in FIGS. 3 and 4, a horticultural lighting arrangement according to the present disclosure may comprise a plurality of horticultural luminaires according to the present disclosure and a lighting control system according to the present disclosure. The lighting control system may be formed by a cloud computing system (i.e. computing cloud) or a computing device (e.g. central computer) that is connected to the luminaires. In one embodiment, the lighting control system may directly communicate with the luminaires via wired or wireless communication. In another embodiment, an auxiliary communication unit is used for arbitrating data between the lighting control system and the luminaires. The lighting control may further be connected to an external computer network, such as the Internet.

During commissioning of a horticultural lighting arrangement according to the present disclosure, a lighting control system controlling the horticultural lighting arrangement may receive configuration information originating from the luminaires. For each luminaire, this configuration information may comprise an identifier, type/specification of possible modules, and position data, for example. Based on the position data determined by the positioning units of the luminaires, (absolute or relative) positions of the luminaires may be automatically determined. When the positions of the luminaires are known, the lighting control system may build a topology of the luminaires. In this context, the term "topology" represents the spatial configuration of the luminaires, i.e. how the luminaires are positioned with respect to each other in a space. When determining the topology, the lighting control system may utilize a pre-existing floor plane of the space the luminaires are commissioned in. The lighting control system may assign each luminaire to the floor plan based on the position data and the unique identifier within the within the configuration information, for example.

Instead of directly determining the exact positions of the luminaires based on the position information provided by the luminaires, the position information may be used to form an initial estimate of the topology of the luminaires may be formed. This estimate of the topology may then be confirmed or updated with manual measurements and/or other available position information, such as the floor plan.

The position of the luminaires may also be determined using a computer-executed software application, the control electronics of the luminaires, and a previously specified light plan which may be in the form of a 3D model describing the layout and shape of the room with the luminaires. The luminaires may have been installed to the room according to the light plan without uniquely identifying each luminaire and/or without assigning uniquely-identified luminaires to particular positions in the light plan.

The application may implement a graphical user interface showing a 3D presentation of the room and visual representations of luminaires registered to be in the room. The luminaires in the room may be wirelessly registered via a wireless communication device assigned to the room. The 3D presentation may be based on the 3D describing the layout and shape of the room with the luminaires. Initially, the luminaires may be only approximately positioned or may be not yet positioned.

The luminaires may then be positioned by the user using the application according to the following procedure. At start, all luminaires may confirm that they are active with a uniform flashing. The user may then select one luminaire on the graphical user interface of the application. The selected luminaire may remain flashing while other, non-selected luminaires may be shut off. The user may, visually or otherwise, identify the location of the selected luminaire in the room (the physical real room). The user may then identify a corresponding location for the selected luminaire on the graphical user interface of the application. For example, the user may drag a graphical representation of the luminaire to the corresponding location by using a touch screen or mouse. The user may then confirm the location to the software application. The above-described procedure may be repeated until all luminaires have been positioned. During use, environmental data from luminaires may be coupled to the determined positions of the luminaires, and the lighting control system may be used for storing this information. The ability to track and log environmental data with high accuracy and density improves plant breeding and crop protection development. Detailed records of the environmental conditions will enable the researchers to better identify real plant reactions to their plant-crosses or active ingredients in crop protection and not confusing environmental causes with real reactions.

The lighting control system may also provide a visual representation of the topology of the luminaires. The visual representation may be in the form of a graphical user interface shown on a display, for example. The display may show the luminaires as graphical elements. Positions of these graphical elements on the graphical user interface may correlate with the real locations of the luminaires in space. The visual representation of the topology may also show other configuration information sent by the luminaires. For example, the visual representation may show possible type/specification information on modules present in the luminaires.

The lighting control system may also utilize operating status information sent by the luminaires. The lighting control system may gather and store data on the operational data and use the gathered data for diagnostics purposes. For example, lighting control system may monitor the operating status information for deviations between the operating statuses of the luminaires. If a deviation in an operating status of a luminaire is detected (e.g. a current of a light emitting unit in a luminaire deviates significantly from currents of corresponding light emitting units of other luminaires producing the same final spectrum), the device may be considered faulty and/or scheduled for maintenance. The visual representation of the topology of the luminaires may visualize operating status information of the luminaires.

In addition, information related to the plants within the light cones of the luminaires may be displayed on the graphical user interface. For example, as described earlier, the luminaires may also provide the lighting control system with distance measurements generated by proximity sensors in the luminaires. Based on the distance information sent by a luminaire, an approximation of light intensity received by an object, such as plant, from the luminaire can be calculated. The distance information may also be utilized in calculating an approximation of crop yield, for example. This distance information may be displayed on the graphical user interface. Based on environmental data coupled to the luminaires and the position information of the luminaires, distribution of values of environmental parameters can be shown on the graphical user interface. For example, if the luminaires are provided with temperature sensors, a temperature distribution in a cultivation environment can be shown with a high spatial accuracy.

The lighting control system may implement various automated functions. For example, an end user may have desired target settings for the horticultural lighting arrangement. In this context, the term "target settings" refers to pre-set settings in the form of a desired spectrum or a time-dependent sequence of spectrums, for example. The end user may send a specification describing the target settings to the light control system. Based on the received specification, the lighting control system determines appropriate control data to be sent to the luminaires. Upon receiving the control data, the luminaires control their light emitting units according to the control data. In this manner, accurate and dynamically changing light intensities can be created, light spectra or dynamic light programs spanning from seconds to years.

The lighting control system offers advantages in plant production in growing environment without natural light, such as vertical farms in warehouses, mine tunnels, basements or any other environments without natural light, where all (including light) can be fully controlled. Such production environments offer the advantage of nearly perfect control of crop production cycles, without sensitivity to outdoor light, thus being able to delivery planned crops regardless of season. This is a great advantage to the grower, as the demand for plant crops is not or seldom dependent on season. For example, a lot of strawberries are consumed in Netherlands and other European countries at Christmas, when they by nature do not grow and greenhouse production can be affected by cold and/or cloudy weather.

In order to enable easy configuration of a horticultural lighting arrangement according to the present disclosure, a collection of pre-set target settings may be generated. A cloud-based service may be used for managing the target settings, for example. A lighting control system that generates environmental sensor data can also be used for generating target settings for a climate control system. For example, once an operator has established a first successful vertical farm, it may be desirable to replicate the conditions of the first farm in the subsequent farms in new sites. Here the new system can provide both target data, based on data stored to the cloud and also measure that the targets are reach with high spatial accuracy, thanks to the dense lighting network.

In some embodiments, the lighting control system may adjust the control data in order to achieve an evenly distributed emission intensity among the luminaires. In the periphery of the arrangement of luminaires (e.g. next to walls or in the corners of a growth room), fewer luminaires are present to generate light emissions. Thus, the lighting control system may amplify the emission intensities of the luminaires in the periphery by modifying the control data sent to the luminaires.

In addition, the lighting control system may adjust the control data on the basis the distance between the luminaire and a plant illuminated by the luminaire. For example, the control system may calculate the lighting intensity received by the object on the basis of the distance and then modify the control data of the luminaire in order to achieve an even lighting intensity for all plants. Alternatively, the luminaire may receive a desired lighting intensity (and spectrum) in the control data, measure the distance between itself and the plant, and modify the emissions of its light emitting units according to the desired lighting intensity.

The lighting control system may also be used for research purposes. For example, the lighting control system may divide the topology of the luminaire into regions and set the luminaires to illuminate plants with different spectrums. The lighting control system may then monitor crop yield based on distance information provided by proximity sensors in the luminaires. Alternatively, or in addition, the growth of different breeds of a plant can be easily monitored with the proximity sensors.

The horticultural lighting arrangement and the lighting control system according to the present disclosure may also be used as a user interface. For example, the lighting control system may be used for defining a point/region of interest within a space illuminated by the horticultural lighting arrangement. One or more plants may be illuminated with a visibly (human vision) different lighting intensity and/or different spectrum. In this manner, one or more plants can be highlighted. Thus, locating a specific plant is easier. Further, locating luminaires that are to be maintained are easier to locate by using the same approach.

It is also possible to build an information system that utilizes information generated by the horticultural lighting arrangement and the lighting control system according to the present disclosure. The information system may be configured to implement augmented reality (AR) in a cultivation environment with the aid of an AR device. The information system may comprise a plurality of horticultural luminaires according to the present disclosure and AR device, for example. The AR device may be a smart phone or a tablet computer comprising a display and a camera with a video functionality, for example. The AR device may use the camera to generate a live video, and use the display to show a real-time user's view of his or her surroundings based on the live video. The AR device may also be a dedicated AR headset displaying information directly to the user's eye.

The information system may use the AR device to superimpose (i.e. augment) additional information to the user's view of his or her surroundings in the cultivation environment when viewed via the AR device. The information system may augment environmental data originating from the horticultural luminaires to plants viewed with the AR device. For example, the information system may couple present temperature, humidity, light levels, and/or amount of $CO_2$ to the plant viewed via the AR device. The information system may also show data on the plant itself, e.g. the species and breed of the plant, it's length and deviation of the length with respect to other plants. The information system may also access history data of the plant stored locally or in a cloud and display the stored history. Further, the information system may show estimates of future values of the plants (e.g. estimated future height based on extrapolation of stored height data).

The information system may also augment the environmental and/or other information to luminaires viewed via the AR device. For example, the information system may show a diagram of the spectrum presently produced by a luminaire, and the temperature and/or other present parameters of the luminaire.

The position information provided by the luminaires may be utilized in determining where and how the augmented information is displayed. The AR device may position itself by using the same positioning means as the luminaires. Alternatively or in addition, the luminaires may be provided with visual tags (e.g. QR codes) for identifying the luminaires and for positioning the AR device with respect to the luminaires. The AR device may also be used to implement the software application for determining the positions of the luminaires. The AR device may augment the 3D representation of the room with graphical representations of the luminaires to the user's view of the cultivation room. The user may then move the augmented graphical representations to correspond with the real luminaires. Once all graphical representations of the luminaires have been positioned to correspond with the real luminaires, the positions of the graphical representations may be used to determine values for the positions of the real luminaires.

It is obvious to a person skilled in the art that the inventive concept can be implemented in various ways. The invention and its embodiments are not limited to the examples described above but may vary within the scope of the claims.

The invention claimed is:

1. A horticultural lighting arrangement comprising a plurality of horticultural luminaires to be positioned within a cultivation environment, and a control system, wherein each of the horticultural luminaires comprises
   a main light emitting unit comprising at least one LED for generating a main spectrum of the horticultural luminaire,
   an environmental sensor for measuring environmental data, and
   control electronics that is configured to
      wirelessly determine a position data of the horticultural luminaire, and
      send out the environmental data and the position data to be received by the control system, and
   wherein the control system is configured to
      form a representation of spatial configuration of the luminaires within the cultivation environment based on the position data, and
      form a representation of a distribution of values of environmental parameters within the cultivation environment based on the environmental data and the spatial configuration of the luminaires.

2. The horticultural lighting arrangement according to claim 1,
   wherein the control system is configured to generate control data for each of the plurality of luminaires, and
   wherein the control electronics is further configured to
      receive control data originating from the control system, and
      control the emission intensity of the main light emitting unit on the basis of the control data.

3. The horticultural lighting arrangement according to claim 2, wherein
   each luminaire further comprises at least one auxiliary light emitting unit comprising at least one LED for generating at least one side spectrum, and
   the control electronics is further configured to separately control the emission intensity of each of the at least one auxiliary light emitting unit on the basis of the control data.

4. The horticultural lighting arrangement according to claim 3, wherein a rated power of the at least one auxiliary light emitting unit is less than 50% of a rated power of the main light emitting unit.

5. The horticultural lighting arrangement according to claim 1, wherein each of the plurality of the horticultural luminaires further comprises
a proximity sensor configured to measure a distance between the luminaire and an object within a light cone of the luminaire.

6. The horticultural lighting arrangement according to claim 5, wherein the control system is configured to
calculate an approximation of crop yield on the basis of the distances.

7. An information system comprising
the horticultural lighting arrangement according to claim 1, and
an Augmented Reality (AR) device configured to augment environmental data originating from the horticultural luminaires to a plant and/or horticultural luminaire when viewed with the AR device.

8. The horticultural lighting arrangement according to claim 2, wherein each of the plurality of the horticultural luminaires further comprises
a proximity sensor configured to measure a distance between the luminaire and an object within a light cone of the luminaire.

9. The horticultural lighting arrangement according to claim 3, wherein each of the plurality of the horticultural luminaires further comprises
a proximity sensor configured to measure a distance between the luminaire and an object within a light cone of the luminaire.

10. The horticultural lighting arrangement according to claim 4, wherein each of the plurality of the horticultural luminaires further comprises
a proximity sensor configured to measure a distance between the luminaire and an object within a light cone of the luminaire.

11. A method of controlling the horticultural lighting arrangement according to claim 1, wherein the method comprises
providing a cultivation environment with a plurality of horticultural luminaires, each horticultural luminaire comprising
a main light emitting unit comprising at least one LED for generating a main spectrum of the horticultural luminaire,
an environmental sensor for measuring environmental data, and
control electronics that is configured to wirelessly determine a position data of the horticultural luminaire, send out the environmental data and the position data to be received by a control system;
determining positions of the horticultural luminaires with the aid of the control electronics of the horticultural luminaires;
forming a representation of spatial configuration of the luminaires within the cultivation environment based on the position data; and
forming a representation of a distribution of values of environmental parameters within the cultivation environment based on the environmental data and the spatial configuration of the luminaires.

12. The method according to claim 11, wherein the control electronics of each of the plurality of luminaire is further configured to receive control data originating from the control system and control the emission intensity of the main light emitting unit on the basis of the control data, and wherein the method further comprises
generating the control data for each of the plurality of luminaires.

13. The method according to claim 11, wherein determining the positions of the horticultural luminaires comprises
providing the cultivation environment with external receivers at known locations within the cultivation environment,
determining positions of the horticultural luminaires with the control electronics of the horticultural luminaires and the external receivers, and
removing the external receivers after the positions of the luminaires have been determined.

14. The method according to claim 11, wherein the positions of the horticultural luminaires are configured to remain constant with respect to plants in the cultivation environment.

15. The method according to claim 11, wherein the method further comprises
displaying representations of the environmental data on a graphical user interface on a display such that the positions of the representations of the environmental data on the graphical user interface correlate with the positions of the horticultural luminaires in the horticultural lighting arrangement.

16. The method according to claim 15, wherein the graphical user interface is implemented as an Augmented Reality (AR) device that augments environmental data to plants viewed with the AR device.

17. A non-transitory computer-readable medium on which is stored a software program having instructions that, when executed by a computing device or system, cause the computing device of system to perform the method according to claim 11.

18. A non-transitory computer-readable medium on which is stored a software program having instructions that, when executed by a computing device or system, cause the computing device of system to perform the method according to claim 12.

19. A non-transitory computer-readable medium on which is stored a software program having instructions that, when executed by a computing device or system, cause the computing device of system to perform the method according to claim 13.

20. A horticultural luminaire comprising:
a main light emitting unit comprising at least one light emitting diode (LED) configured to generate a main spectrum of the horticultural luminaire,
an environmental sensor configured to measure environmental data, and
control electronics configured to
wirelessly determine a position of the horticultural luminaire including the environmental sensor therein, and
send out the environmental data and the position data to be received by a control system,
wherein the main light emitting unit, the environmental sensor, and the control electronics are implemented on one printed circuit board (PCB).

21. The horticultural luminaire according to claim 20, wherein the control electronics is configured to wirelessly and automatically detect the position of the horticultural luminaire including the environmental sensor therein.

* * * * *